(No Model.) 2 Sheets—Sheet 1.

J. THOMSON.
APPARATUS FOR PREVENTING DAMAGE TO WATER METERS.

No. 602,377. Patented Apr. 12, 1898.

Witnesses
J. G. Hinkel
J. J. McCarthy

Inventor
John Thomson
by Foster Freeman
Attorneys

THE NORRIS PETERS CO., PHOTO-LITHO., WASHINGTON, D. C.

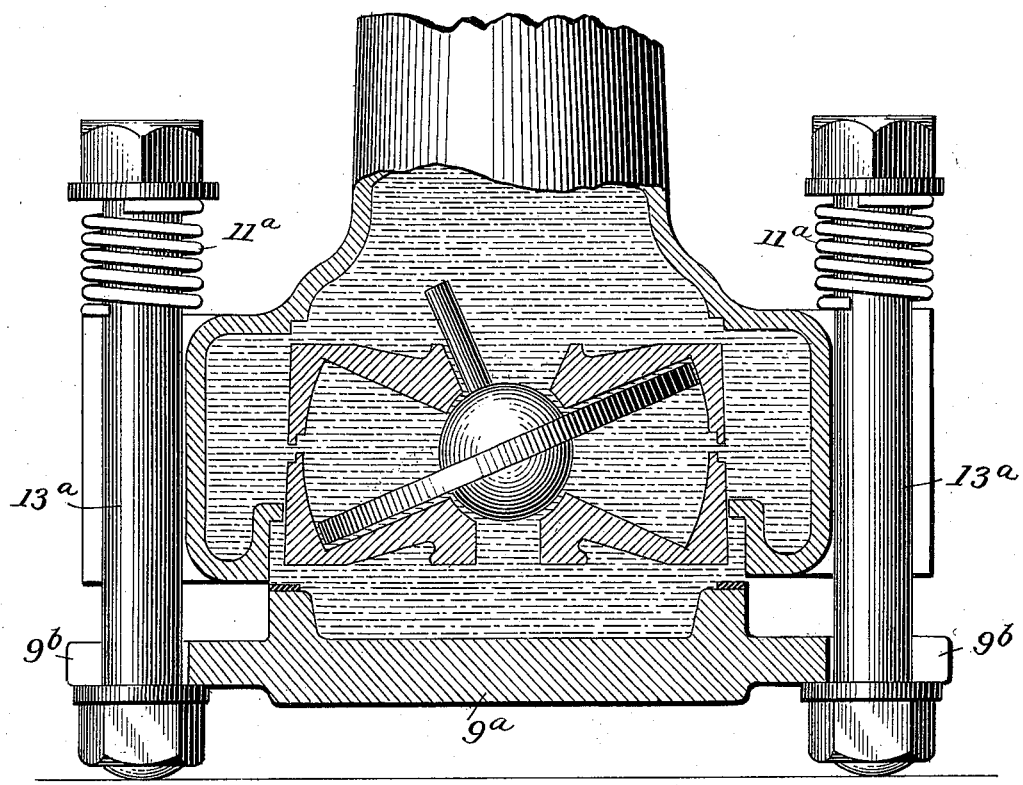

UNITED STATES PATENT OFFICE.

JOHN THOMSON, OF BROOKLYN, NEW YORK, ASSIGNOR TO THE NEPTUNE METER COMPANY, OF NEWARK, NEW JERSEY.

APPARATUS FOR PREVENTING DAMAGE TO WATER-METERS.

SPECIFICATION forming part of Letters Patent No. 602,377, dated April 12, 1898.

Application filed June 10, 1897. Serial No. 640,241. (No model.)

*To all whom it may concern:*

Be it known that I, JOHN THOMSON, a citizen of the United States, residing in Brooklyn, Kings county, State of New York, have invented certain new and useful Improvements in Apparatus for Preventing Damage to Water-Meters when Frozen, of which the following is a specification.

My invention relates to water-meters, and more particularly to the manner of securing the closing cap or head of the casing, preventing damage when an abnormal strain is on the casing; and to these ends my invention consists in the features hereinafter specified, constructed, and arranged to operate substantially in the manner set forth.

Figure 1:
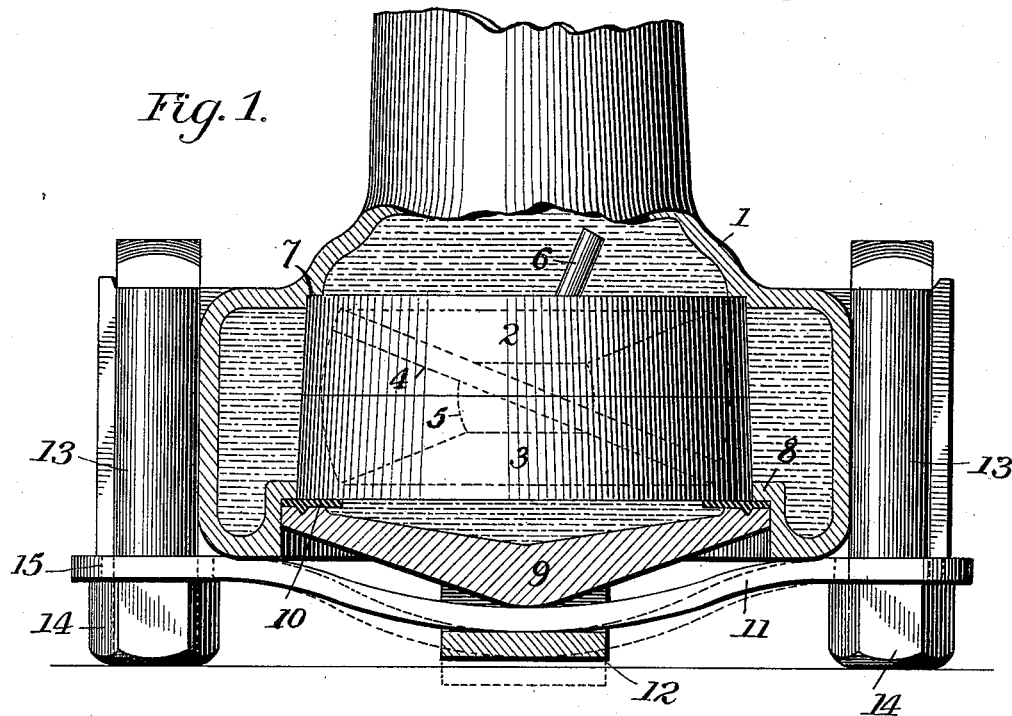
Figure 2:
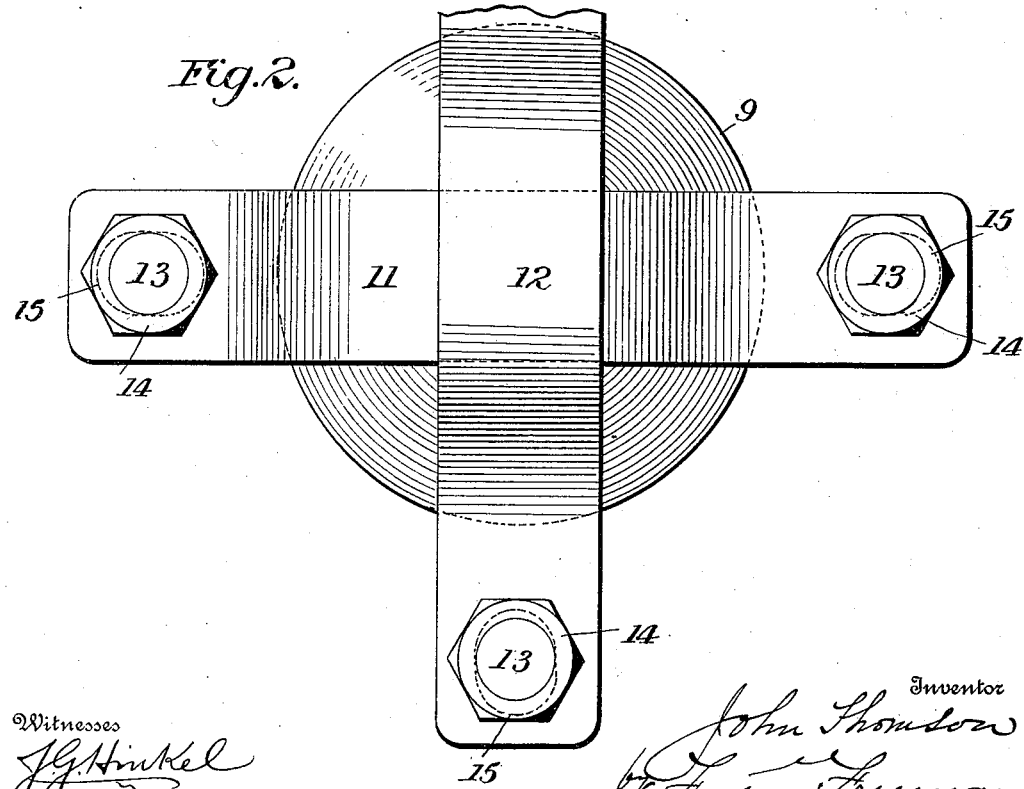

Referring to the accompanying drawings, Figure 1 is a vertical section of a portion of a water-meter, showing one embodiment of my invention; and Fig. 2 is a bottom plan view of a closing cap or head and means for holding it. Fig. 3 is a view similar to Fig. 1 of a modification, but with the parts shown in the position which they will assume when the water in the meter is frozen.

While my invention is applicable to various forms and constructions of water-meters, it is more especially adapted to disk water-meters, and I have illustrated my invention in a meter of that kind; but the invention could of course be adapted and applied to other forms of meters by those skilled in the art.

In the manufacture and construction of these meters it is desirable to arrange the parts so that they can be quickly assembled or dismounted and when assembled maintain water-tight joints.

It is well known that water-meters are liable to injury from the freezing of the water, which on expanding disrupts one or the other sections of the main casing and distorts the internal casing of the meter unless provision is made to prevent such damage. These features have been recognized by me and have been overcome by constructions shown in my Patents No. 520,197, granted May 22, 1894, and No. 566,113, granted March 10, 1896, and while those constructions have proven useful and valuable my present invention may be said to be an improvement thereon.

It will be noticed that while the objects stated are readily attained in the previous constructions if, perchance, the water becomes frozen in the meter it is required that a certain part of the construction must be disrupted and be replaced, the action contingent thereon saving the main external and internal parts of the meter from damage. This, however, requires the substitution of a new portion for that destroyed, and of course the meter is rendered useless after such disruption until a new part can be replaced. By my present invention I accomplish these results without the necessity of destroying any portion of the meter, and, furthermore, I provide such a construction that even though the water becomes frozen and the parts are separated by the expansion of the ice, preventing the bursting of the casings, yet as soon as the ice melts the parts will automatically be restored to operative position without the application of a new part and even without the attention of an attendant. I thus avoid the necessity of breaking or disrupting any portion of the meter or interfering with its continued operation after the ice is melted or removed. Furthermore, my present construction is also advantageous where meters are liable to be subjected to heavy water-rams, which would be destructive to the meter, as the parts will yield to relieve such temporary strains and will immediately reset themselves, so as to operate in a proper manner.

My invention, broadly stated, consists in providing a water-meter with a closing cap or head which is held in position under resilient pressure, which pressure is sufficient to maintain the parts in proper condition for ordinary operation, but allows them to yield under extraordinary pressure to prevent the destruction or injury of the meter, and to thereafter restore themselves automatically to position when the excessive pressure is relieved. This general purpose and object of my invention can be accomplished in many and various ways. Hence I have shown in the accompanying drawings but two means, simple yet effective, for accomplishing the result.

In said drawings there is shown a main casing 1, of a conventional form, in which is mounted a disk-casing composed of two sections 2 3, containing the disk 4, (shown in dotted lines,) ball 5, and spindle 6, the said sections of the disk-casing being held together and also pressed against the shoulder or seat 7, the side bearing in the edges of the opening 8 being preferably tapered. This disk-casing is held together, as just described, by the plate, head, or cap 9, there preferably being an interposed gasket 10 between the face of the plate and the disk-casing and adjacent face of the main casing. Suitable means are provided for holding the head 9 in this position against all ordinary pressures, so that the head will be water-tight, but at the same time which will permit it to yield under extraordinary pressures, as water-rams, freezing, or otherwise, and for then restoring the parts to their normal positions. This I accomplish by providing securing devices which are resilient in their action. Thus I have shown a clamp or clamps formed of one or more parts 11 12, they being in this instance made of resilient material and being secured to the main casing, as by the bolts and nuts 13 14 or in any other desirable way. When thus secured the bolt-holes are preferably made oblong, as at 15, to permit the movement of the clamp, as indicated in dotted lines in Fig. 1. With this construction it will be seen that when there is an undue hydraulic pressure on the head 9 from any cause sufficient to overcome the initial tension imposed upon the head by the resilient clamp the clamp will yield, allowing the head to be forced downward. The disk-casing may follow the head, and even the sections of the disk-casing may be driven asunder; but as soon as the cause of the extraordinary pressure is removed the parts will be reset to their normal positions under the resilient action of the clamp. Consequently all damage or destruction to the parts is avoided, and the meter will be in operative condition after the emergency has passed.

While I have shown a somewhat primitive means in the form of a clamp or clamps, it is obvious that other forms of resilient devices may be used to accomplish the same result, they being connected to the meter-casing or arranged to bear on the head of the meter, so as to maintain it in proper operative position under normal pressures, but to yield under extraordinary pressures and again restore the parts by their resilient or inherent action. Hence it will be obvious that my invention is not limited to the specific means shown and described. Thus in Fig. 3 the head $9^a$ has integral arms or projections $9^b$ engaging the bolts $13^a$, provided with springs $11^a$, which permit the head and other parts to yield under undue pressure and restore them to their normal positions.

What I claim is—

1. In a water-meter, the combination with a closing-head, of resilient means for holding the head in position.

2. In a water-meter, the combination with the main casing, the disk-casing and the head, of a resilient clamp arranged to bear upon the head and maintain it in proper position.

3. The combination with the main casing, the disk-casing and the head, of a clamp comprising resilient material secured to the casing and pressing upon the head.

4. The combination with the main casing, the disk-casing and the head, loosely fitting the main casing and bearing against the disk-casing, of a resilient clamp comprising cross-strips secured to the main casing and pressing upon the head, substantially as described.

5. In a disk water-meter, the combination of a main casing, a separable disk-casing, a closing-head bearing against the disk-casing to secure it together and to its seat, and a resilient clamp attached to the main casing and impinging against the head, substantially as described.

In testimony whereof I have signed my name to this specification in the presence of two subscribing witnesses.

JOHN THOMSON.

Witnesses:
 HELEN M. BLANCHFIELD,
 GEO. L. DE FRAINE.